Aug. 15, 1961      E. H. PACE      2,995,884
ROTARY BEATER COTTON HARVESTER
Filed April 13, 1959
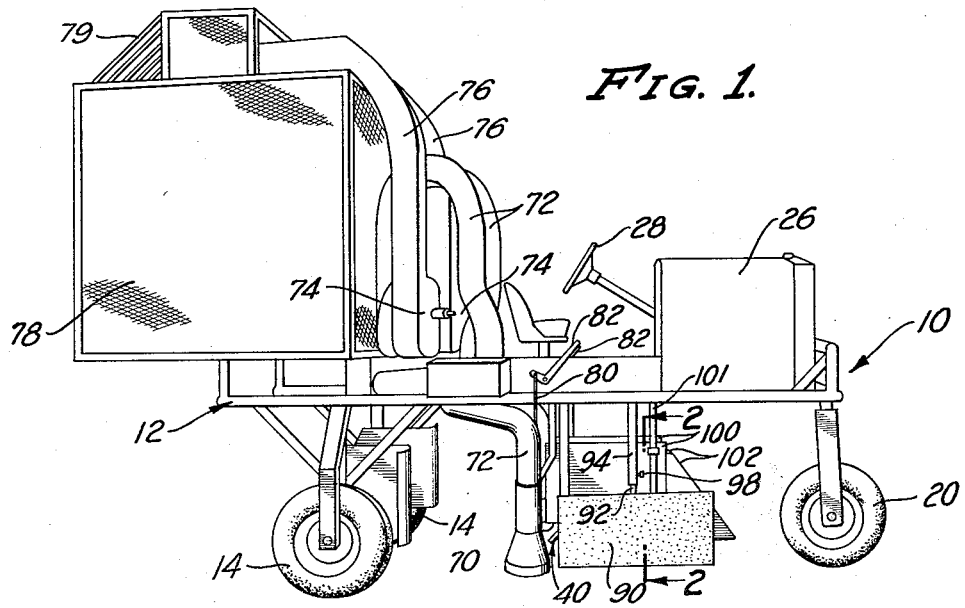
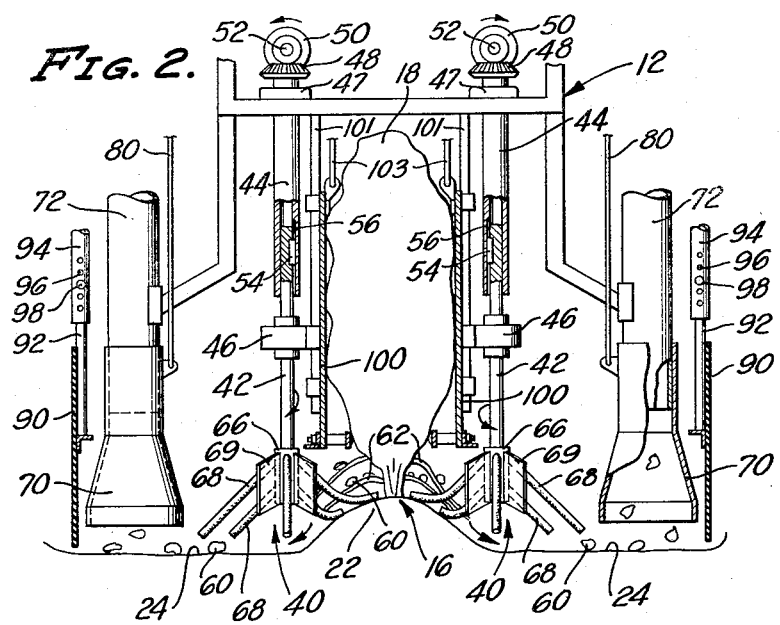
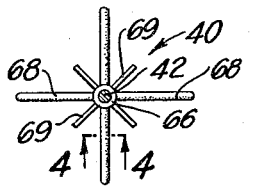
INVENTOR
EDGAR H. PACE
BY HIS ATTORNEYS
HARRIS, KIECH, RUSSELL & KERN United States Patent Office 2,995,884
Patented Aug. 15, 1961

2,995,884
ROTARY BEATER COTTON HARVESTER
Edgar H. Pace, 925 Bluff Road, Montebello, Calif.
Filed Apr. 13, 1959, Ser. No. 805,988
12 Claims. (Cl. 56—29)

The present invention relates to cotton picking equipment and a primary object thereof is to provide a cotton picker, or a cotton gleaner, for recovering the cotton on the lowermost branches of cotton plants and on the ground beneath the plants, such cotton being missed by standard picking machines. The proportion of cotton which is missed with conventional equipment, and which is recoverable with the present invention, is substantial so that the invention is of definite economic advantage to the cotton grower, which is an important feature.

Another object of the invention is to provide a cotton picker which recovers low-lying cotton with a minimum recovery of trash and dirt.

More particularly, an object of the invention is to provide a cotton picker which includes: a vehicular chassis adapted to straddle a row of cotton plants and to move along the row; a pair of laterally spaced beaters mounted on the chassis for rotation about upright axes and adapted to receive the row therebetween, the beaters being located adjacent the bottom of the chassis just above ground level and including hubs carrying fingers which strip cotton from the lowermost branches of the plants as the beaters rotate in opposite directions and which propel such cotton, and cotton on the ground beneath the plants, laterally outwardly; means on the chassis and connected to the beaters for rotating them in such opposite directions; and a pair of laterally spaced pickup means carried by the chassis adjacent the bottom thereof and just above ground level and laterally outwardly of the beaters for picking up the cotton propelled laterally outwardly by the fingers, the pickup means preferably being vacuum operated.

An important object of the invention is to provide beaters which include flexible and resilient, elastomeric fingers extending radially outwardly and downwardly into engagement with the lowermost branches of the cotton plants and into engagement with the ground therebeneath to recover the cotton on the lowermost branches and on the ground, the fingers being capable of yielding whenever they encounter obstructions. A related object is to provide the beaters with vertically spaced, circumferential rows of circumferentially spaced, elastomeric fingers extending radially outwardly and downwardly, the fingers preferably being arranged in circumferentially spaced vertical rows also.

A further object is to provide the beaters with vertical fins between the vertical rows of fingers, the fins extending radially a distance much less than the lengths of the fingers.

The foregoing construction for the beaters insures maximum recovery of low-lying cotton with minimum propulsion of trash and dirt into the paths of the vacuum pickup means, and with no winding of the lowermost branches of the cotton plants around the beaters, which are important features.

Another object of the invention is to provide the beaters with fingers which are tubular and which are merely pieces of elastomeric hose, such as rubber or elastomeric plastic hose.

A further object of the invention is to provide on the chassis a pair of laterally spaced backstop means located adjacent the bottom of the chassis and just above ground level and laterally outwardly of the vacuum pickup means to prevent laterally outward movement of the cotton beyond the paths of the pickup means.

Another object is to provide a pair of laterally spaced guard means carried by the chassis adjacent the bottom thereof and a short distance above ground level and laterally inwardly of the beaters, and adapted to receive the row therebetween, for elevating the intermediate and upper branches of the cotton plants out of the paths of the beaters, whereby the beaters act only on the lowermost branches at or just above ground level.

Still another object is to provide means for vertically adjusting the positions of the beaters, the vacuum pickup means, the backstop means and the guard means to compensate for terrain variations, such as variations in ditching for irrigation purposes. In this connection, the vacuum pickup means are preferably vertically adjustable from an operating station, such as a driver's seat on the chassis, so that the pickup means may be elevated quickly and easily to avoid picking up any accumulations of leaves, or other trash, which may be in the paths thereof.

The foregoing objects, advantages, features and results of the present invention, together with various other objects, advantages, features and results thereof which will be evident to those skilled in the cotton picking art in the light of this disclosure, may be attained with the exemplary embodiment of the invention described in detail hereinafter and illustrated in the accompanying drawing, in which:

FIG. 1 is a perspective view of a cotton picker which embodies the invention;

FIG. 2 is an enlarged, fragmentary view, partially in section and partially in elevation, taken along the arrowed line 2—2 of FIG. 1;

FIG. 3 is a top plan view of a beater of the invention; and

FIG. 4 is an enlarged sectional view taken along the arrowed line 4—4 of FIG. 3.

In the drawing, the numeral 10 designates a vehicular chassis of the cotton picker, the chassis being shown as including a frame 12 having rear wheels 14 adapted to straddle a row 16 of cotton plants 18, and having a front wheel 20 adapted to run along one side of the row. In the drawing, the plants 18 are shown as growing on a raised bed 22 between irrigation ditches 24 in which the rear wheels 14 run and in one of which the front wheel 20 runs. However, it will be understood that the invention may be utilized in instances where the raised plant bed 22 and the irrigation ditches 24 do not exist, although it is particularly adapted for use under such conditions.

The frame 12 carries an engine or motor 26 which drives the rear wheels 14 to propel the chassis 10 along the row 16, the driving connection between the engine and the rear wheels having been omitted from the drawings for the sake of clarity. The front wheel 20 is a steerable wheel controlled by a steering wheel 28 on the chassis 10 in front of an operator's or driver's seat thereon.

Mounted on the chassis 10 for rotation about upright axes are laterally spaced beaters 40 adapted to receive the row 16 therebetween, the beaters being located adjacent the bottom of the chassis just above ground level. The beaters 40 are carried by shafts 42 which are rotatable in thrust bearings 46 and which extend upwardly into tubes 44 rotatable in bearings 47 on the frame 12 and provided at their upper ends with bevel gears 48 driven by bevel gears 50 on drive shafts 52 suitably connected to and driven by the engine 26 in a manner not specifically shown. The drive shafts 52 are rotated in opposite directions so as to rotate the beaters 40 in opposite directions, the directions of rotation of the beaters being indicated by the arrows in FIG. 2 of the drawing.

The beater shafts 42 are keyed to the tubes 44 by keys 54 disposed in elongated keyways 56. With this construction, the vertical positions of the beaters 40 may be varied to accommodate terrain variations, due, for example, to variations in the height of the plant bed 22, or due to the absence of such bed, the manner in which the beaters are adjusted vertically being considered hereinafter.

The beaters 40, as will be clear from FIG. 2 of the drawing, are located just above ground level in positions to engage and strip cotton 60 from the lowermost branches 62 of the cotton plants 18, the beaters propelling or flinging such cotton laterally outwardly where it is picked up in a manner to be described. As shown in FIG. 2, the beaters 40 are set in such vertical positions that they actually engage the sides of the plant bed 22, when such bed is present, to insure recovery of cotton 60 on branches lying on, or in close proximity to, the ground, as well as any which may have fallen onto the ground beneath the plants.

Considering the beaters 40 more specifically, each includes a hub 66 suitably connected to the lower end of the corresponding beater shaft 42. The hub 66 of each beater 40 carries vertically spaced, circumferential rows of circumferentially spaced fingers 68, there being two vertically spaced, circumferential rows of fingers with four fingers in each circumferential row in the particular construction illustrated. Preferably, the fingers 68 are also arranged in circumferentially spaced vertical rows, there being four such rows shown. However, these numbers may be varied without departing from the spirit of the invention.

The fingers 68 are flexible and resilient, being formed of an elastomeric material, such as natural or synthetic rubber, or a suitable elastomeric plastic material. Preferably, the fingers 68 are tubular, as shown in FIG. 4 of of the drawing, and may simply be pieces of elastomeric hose attached to the hub 66 of each beater 40 at their inner ends. An important feature of the invention is that the fingers 68 extend radially outwardly and downwardly, preferably at an angle of the order of 45° to the axis of rotation of the corresponding beater 40, although this angle may be varied as desired.

The hubs 66 also carry rigid vertical fins 69 between the vertical rows of fingers, these fins preferably being less than half as long, radially, as the fingers.

With the foregoing construction, the beaters 40 may be operated close to ground level and may engage the sides of the plant bed 22, when present, to insure recovery of cotton 60 on the lowest-lying branches 62, as well as cotton on the ground beneath the plants 18. Being formed of elastomeric material, the fingers 68 may yield readily, as shown in FIG. 2, when they strike the ground, or other obstructions. Another important feature resides in the particular finger pattern on each beater 40, and especially the outward and downward inclination of the fingers and the fins 69 therebetween. This construction results in effective recovery of the cotton adjacent ground level with a minimum recovery of trash and dirt and without wrapping the lowermost branches 62 of the cotton plants 18 around the beaters.

The beaters 40 propel or fling the cotton 60 which they recover from the low-lying branches 62 and from the ground beneath the plants 18 laterally outwardly, and, to some extent, in a direction along the row 16 corresponding to the directions of rotation of the beaters adjacent the row. The cotton 60 propelled or flung laterally outwardly in this manner is picked up by two laterally spaced, vacuum pickup means or nozzles 70 located laterally outwardly of and behind the beaters 40, the vacuum nozzles 70 being located just above ground level. The vacuum nozzles 70 are slidable on upright vacuum ducts 72 which, as shown in FIG. 1, are connected to the inlet sides of blowers 74 the outlet sides of which communicate with outlet ducts 76 leading into a foraminous hopper 78, which may be formed of wire mesh, carried on the frame 12. The ducts 76 discharge against a grill 79 which retains the cotton, but permits dust and small particles of trash to escape. The blowers 74, only one of which is clearly visible in FIG. 1, are driven by the engine 26 in any suitable manner, which is not shown in the drawing for the sake of clarity.

Connected to the pickup nozzles 70 are rods 80 which extend upwardly to and are connected to levers 82 on the frame 12 on opposite sides of the driver's seat. By means of these levers, the driver may raise the vacuum nozzles 70, by causing them to slide upwardly on the vacuum ducts 72, independently of each other, thereby avoiding the picking up of any large accumulations of leaves, or other trash, which may be in the path of either nozzle.

The cotton 60 is prevented from being flung outwardly beyond the paths of the pickup nozzles 70, i.e., outwardly beyond the zones of effectivenesses of these nozzles, by two laterally spaced backstop means 90 carried by the chassis 10 just above ground level and located slightly laterally outwardly of the pickup nozzles 70. Each backstop means 90 comprises a plate disposed in a substantially vertical plane and oriented in the fore-and-aft direction, and is located somewhat forwardly of the corresponding pickup nozzle 70 so that it deposits the cotton 60 in a windrow in the path of the corresponding nozzle.

Each backstop means 90 is carried by a substantially vertical rod 92 extending upwardly into a tube 94 on the frame 12, each tube 94 having a row of vertically spaced holes 96 each of which is adapted to receive a pin 98 extending into the corresponding rod 92. By this means, the positions of the backstop means 90 may be adjusted vertically to compensate for terrain variations.

The branches of the cotton plants 18 above the lowermost branches 62 thereof are prevented from coming in contact with the beaters 40 by two laterally spaced guard means 100 located laterally inwardly of the beaters and adapted to receive the row 16 of cotton plants therebetween. The two guard means 100 are vertically movable on tracks 101 on the frame 12 and each comprises a substantially vertical plate oriented in the fore-and-aft direction, each such plate tapering downwardly and forwardly, as indicated at 102, at its forward end to pick up the cotton-plant branches above the lowermost ones and to elevate them out of the reach of the beaters 40. The guard means 100 may be moved vertically on the tracks 101 in any suitable manner, to accommodate terrain variations, control rods 103 being shown connected to the respective guard means for this purpose. These control rods may be actuated in any suitable manner, as by levers, not shown, similar to the levers 82.

The thrust bearings 46 carrying the beater shafts 42 are shown as mounted on the respective guard means 100, whereby simultaneous vertical adjustments of the guard means and the beaters 40 are achieved to compensate for variations in the height of the plant bed 22.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient fingers which extend radially outwardly, said fingers stripping cotton from the lowermost branches of the plants as the beaters rotate in opposite directions and propelling such cotton laterally outwardly; means carried by said chassis and connected to said beaters for rotating said beaters in said opposite directions; and a pair of laterally spaced pickup means carried by said chassis just above ground level and laterally outwardly of said beaters for picking up from the ground the cotton propelled laterally outwardly by said fingers.

2. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient, elastomeric fingers which extend radially outwardly, said fingers stripping cotton from the lowermost branches of the plants as the beaters rotate in opposite directions and propelling such cotton laterally outwardly; means carried by said chassis and connected to said beaters for rotating said beaters in said opposite directions; and a pair of laterally spaced, downwardly facing, vacuum pickup means carried by said chassis just above ground level and laterally outwardly of said beaters for picking up from the ground the cotton propelled laterally outwardly by said fingers.

3. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient, elastomeric fingers which extend radially outwardly and downwardly, said fingers stripping cotton from the lowermost branches of the plants as the beaters rotate in opposite directions and propelling such cotton laterally outwardly; means carried by said chassis and connected to said beaters for rotating said beaters in said opposite directions; and a pair of laterally spaced, downwardly facing, vacuum pickup means carried by said chassis just above ground level and laterally outwardly of said beaters for picking up from the ground the cotton propelled laterally outwardly by said fingers.

4. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient, elastomeric fingers which extend radially outwardly and downwardly, said fingers stripping cotton from the lowermost branches of the plants as the beaters rotate in opposite directions and propelling such cotton laterally outwardly; means carried by said chassis and connected to said beaters for rotating said beaters in said opposite directions; a pair of laterally spaced, downwardly facing, vacuum pickup means carried by said chassis just above ground level and laterally outwardly of said beaters for picking up from the ground the cotton propelled laterally outwardly by said fingers; and a pair of laterally spaced backstop means carried by said chassis just above ground level and laterally opposite said beaters and laterally outwardly of said pickup means for preventing laterally outward movement of the cotton beyond the paths of said pickup means.

5. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient, elastomeric fingers which extend radially outwardly and downwardly, said fingers stripping cotton from the lowermost branches of the plants as the beaters rotate in opposite directions and propelling such cotton laterally outwardly; means carried by said chassis and connected to said beaters for rotating said beaters in said opposite directions; a pair of laterally spaced, downwardly facing, vacuum pickup means carried by said chassis just above ground level and laterally outwardly of said beaters for picking up from the ground the cotton propelled laterally outwardly by said fingers; a pair of laterally spaced backstop means carried by said chassis just above ground level and laterally opposite said beaters and laterally outwardly of said pickup means for preventing laterally outward movement of the cotton beyond the paths of said pickup means; and a pair of laterally spaced guard means carried by said chassis laterally inwardly of said beaters, and adapted to receive the row therebetween, for elevating the branches of the plants above the lowermost branches thereof out of the paths of said beaters.

6. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient, elastomeric fingers which extend radially outwardly and downwardly, said fingers stripping cotton from the lowermost branches of the plants as the beaters rotate in opposite directions and propelling such cotton laterally outwardly; means carried by said chassis and connected to said beaters for rotating said beaters in said opposite directions; a pair of laterally spaced, downwardly facing, vacuum pickup means carried by said chassis just above ground level and laterally outwardly of said beaters for picking up from the ground the cotton propelled laterally outwardly by said fingers; a pair of laterally spaced backstop means carried by said chassis just above ground level and laterally opposite said beaters and laterally outwardly of said pickup means for preventing laterally outward movement of the cotton beyond the paths of said pickup means; and means connected to said beaters for adjusting the positions of said beaters vertically.

7. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient, elastomeric fingers which extend radially outwardly and downwardly, said fingers stripping cotton from the lowermost branches of the plants as the beaters rotate in opposite directions and propelling such cotton laterally outwardly; means carried by said chassis and connected to said beaters for rotating said beaters in said opposite directions; a pair of laterally spaced, downwardly facing, vacuum pickup means carried by said chassis just above ground level and laterally outwardly of said beaters for picking up from the ground the cotton propelled laterally outwardly by said fingers; a pair of laterally spaced backstop means carried by said chassis just above ground level and laterally opposite said beaters and laterally outwardly of said pickup means for preventing laterally outward movement of the cotton beyond the paths of said pickup means; means connected to said beaters for adjusting the positions of said beaters vertically; means connected to said pickup means for adjusting the positions of said pickup means vertically; and means connected to said backstop means for adjusting the positions of said backstop means vertically.

8. In a cotton picker, the combination of: a vehicular chassis adapted to straddle a row of cotton plants and to move along the row; a pair of laterally spaced beaters mounted on said chassis for rotation about upright axes and adapted to receive the row therebetween, said beaters being located just above ground level and including hubs carrying flexible and resilient fingers which extend radially outwardly, said hubs carrying fins alternating circumferentially with said fingers, the radial extent of said fins being less than half that of said fingers, said fingers stripping cotton from the lowermost branches of the plants as the beaters rotate in opposite directions and propelling such cotton laterally outwardly; means carried by said chassis and connected to said beaters for rotating said beaters in said opposite directions; and a pair of laterally spaced pickup means carried by said chassis just above ground level and laterally outwardly of said beaters for picking up from the ground the cotton propelled laterally outwardly by said fingers.

9. A cotton picker beater including a hub adapted to be rotated about an upright axis and carrying circumferentially spaced, elastomeric fingers, said fingers extending radially outwardly and downwardly from said hub.

10. A cotton picker beater including a hub adapted to be rotated about an upright axis and carrying circumferentially spaced, elastomeric fingers, said fingers extending radially outwardly and downwardly from said hub and terminating below the lower end thereof.

11. A cotton picker beater including a hub adapted to be rotated about an upright axis and carrying circumferentially spaced, elastomeric fingers, said fingers extending radially outwardly and downwardly from said hub and being tubular.

12. A cotton picker beater including a hub adapted to be rotated about an upright axis and carrying circumferentially spaced, elastomeric fingers and circumferentially spaced fins in alternating relation, said fingers extending radially outwardly and downwardly from said hub, the radial extent of said fins being less than half that of said fingers.

References Cited in the file of this patent

UNITED STATES PATENTS

| 1,836,128 | Palmer | Dec. 15, 1931 |
| 2,475,531 | Townsend | July 5, 1949 |
| 2,504,365 | Wallace | Apr. 18, 1950 |
| 2,862,717 | Ronning | Dec. 2, 1958 |